United States Patent
Pyle

(10) Patent No.: US 6,258,159 B1
(45) Date of Patent: Jul. 10, 2001

(54) PRODUCT AND METHOD FOR INCORPORATING SYNTHETIC POLYMER FIBERS INTO CEMENT MIXTURES

(75) Inventor: Russell W. Pyle, Deerfield, IL (US)

(73) Assignee: Polymer Group, Inc., North Charleston, SC (US)

( * ) Notice: Subject to any disclaimer, the term of this patent is extended or adjusted under 35 U.S.C. 154(b) by 0 days.

(21) Appl. No.: 09/385,835

(22) Filed: Aug. 30, 1999

(51) Int. Cl.$^7$ ..................................... C04B 16/10
(52) U.S. Cl. .......................... 106/644; 106/724; 106/803; 106/823
(58) Field of Search ..................... 106/644, 724, 106/802, 803, 823

(56) References Cited

U.S. PATENT DOCUMENTS

| | | | |
|---|---|---|---|
| 4,261,754 | * | 4/1981 | Krenchel et al. . |
| 4,306,911 | * | 12/1981 | Gordon et al. . |
| 4,339,273 | * | 7/1982 | Meier et al. . |
| 4,407,676 | * | 10/1983 | Restrepo . |
| 4,902,347 | * | 2/1990 | Soroushian et al. .................. 428/395 |
| 5,154,955 | * | 10/1992 | Delvaux et al. ..................... 428/34.5 |
| 5,298,071 | * | 3/1994 | Vondran ............................... 106/757 |
| 5,399,195 | * | 3/1995 | Hansen et al. ....................... 106/711 |
| 6,010,786 | * | 1/2000 | Takai .................................... 428/364 |
| 6,071,613 | * | 6/2000 | Rieder et al. ........................ 428/378 |
| 6,099,638 | * | 8/2000 | Garcia ................................. 106/724 |

FOREIGN PATENT DOCUMENTS

| | | | |
|---|---|---|---|
| 24539 | * | 3/1981 | (EP) . |
| 36073 | * | 8/1985 | (HU) . |
| 69013036 | * | 5/1963 | (JP) . |
| 67002436 | * | 3/1965 | (JP) . |
| 54/55222 | * | 12/1979 | (JP) . |
| 57-034069A | * | 2/1982 | (JP) . |
| 57-038358 | * | 3/1982 | (JP) . |
| WO 9959934 | * | 11/1999 | (WO) . |

* cited by examiner

Primary Examiner—Paul Marcantoni
(74) Attorney, Agent, or Firm—Pyle & Piontek

(57) ABSTRACT

A method is disclosed for improving the properties of polymer fibers incorporated into upcured concrete. A wetting agent is incorporated into the molten polymer prior to extrusion into fibers in order to render the fibers durably wettable.

5 Claims, No Drawings

PRODUCT AND METHOD FOR INCORPORATING SYNTHETIC POLYMER FIBERS INTO CEMENT MIXTURES

FIELD OF THE INVENTION

This invention relates to the production of wettable polymer fiber suitable for incorporation into cement mixes.

BACKGROUND

Many proposals have been made to reinforce or otherwise improve the properties of concrete by applying various types of fibers, including asbestos, glass, steel, as well as polymer fibers to aqueous based concrete mixes prior to the curing of the concrete. The types of polymer fibers in use or proposed for use include those composed of polyolefins, especially polypropylene, polyester, polyamide, polyacrylic and polyvinyl alcohol.

Relatively large diameter fibers, for example, in excess of 40 to 60 microns in diameter, can be added to wet concrete, dispersed in the concrete by mixing, followed by pouring and curing of the concrete. Large diameter fibers serve to reinforce the concrete after it has been cured, by providing additional tensile strength and minimizing impact damage and crack propagation.

Small diameter fibers, typically less than 30 to 40 microns in diameter, and having a relatively high surface area, are commonly added to concrete mixes in order to reduce the development of small cracks in the concrete during the curing period. The problem of crack development is known to occur as a result of uneven curing of the concrete.

Polypropylene fibers are produced by a well known melt spinning process, in which molten polymer is pumped through a die having a large number of small openings to produce a tow of continuous filaments. The filaments are cooled and drawn or elongated to increase tensile strength. A size or finish is usually applied to the filaments, followed by drying and tempering if required and chopping into the desired length to provide bundles of fibers. The use of polypropylene fibers is desirable for several reasons, including low raw material cost, excellent physical properties, and the nonreactive properties of the polymer in the alkaline concrete mix.

Several problems are associated with the handling of polypropylene fibers and the uniform dispersion of the fibers into the concrete mix. The fibers are hydrophobic in the sense that they do not absorb water and have a surface which cannot be wetted. As a result, difficulties can arise in obtaining a uniform dispersion of the fibers in the cement mixture using conventional mixing equipment. Another problem which may be encountered, especially with the use of fine fibers, is that the fibers become entangled either during routine handling, packaging and transport, or after they are added to the concrete mix. As a result, the fibers do not disperse evenly and may form clots.

U.S. Pat. No. 5,399,195 discloses the addition of small amounts of fine (less than 30 microns) polymer fibers to concrete. During production, the filaments are treated with a topical wetting agent. After the filaments are chopped into fibers, the wetting agent holds or binds the fibers together in the form of bundles. The bundles remain relatively stable during handling, and when the fibers are added to the concrete mix, the wetting agent promotes dispersion of the fibers. Wetting agents are also commonly applied to polypropylene fibers used to make nonwoven fabrics.

The topically applied wetting agents described above are usually applied as an aqueous solution followed by drying, in order to provide a coating of the wetting agent on the fiber. The coatings are thus water soluble and are easily washed away, especially under high shear conditions of concrete mixing, causing the fibers to return to a hydrophobic state. Also, some types of wetting agents may cause undesirable foaming in the concrete mixture.

Despite recent advances in the art of concrete conditioning and reinforcement, a need exists for additional improvements and refinements, especially in the case of polypropylene fibers, which will provide a more reliable and more controllable technique for successfully providing fiber that will be uniformly dispersed in concrete under a wide variety of conditions.

SUMMARY OF THE INVENTION

In accordance with the present invention, a polypropylene melt is provided with a quantity of an internal surface active agent and is extruded and drawn into filaments and chopped into fibers of appropriate length. Optionally, the filament tows are coated with a water soluble binder after extrusion to cause the chopped fibers to be held together in the form of coherent bundles.

The surface active agent added to the melt tends to rise to the surface of the fibers and provide a lasting reduction of surface tension to the fibers, allowing them to be easily dispersed in the concrete mix. For small diameter fibers, an inexpensive water soluble binder may be applied to hold the fibers together into bundles until they are added to the concrete mix.

DESCRIPTION OF INVENTION

In accordance with the present invention, a tow of a large number of polypropylene fibers is produced using conventional melt spinning techniques. Prior to exit from the spinneret, at least one melt additive or agent is incorporated into the molten polymer. This additive or agent has properties which will result in a reduced surface energy of the formed filaments. This reduced surface energy is manifested as a reduction in surface tension, with the most common functional characteristic being increased liquid wettability of the fibers. The additive or agent does not chemically combine with or chemically modify the base polymer, but forms an immiscible blend upon cooling and is uniformly dispersed in the formed filaments. The dispersed agent will continuously bloom to the surface of the formed filaments in an equilibrium fashion, such that the amount of agent on the surface of the fiber remains essentially constant, regardless of environmental factors or handling. Therefore, the degree of altered or reduced surface tension, or wettability for practical purposes, is relatively stable and is not altered by cutting of the continuous filament tow into staple fibers by washing of the fiber surfaces during incorporation into the concrete mixture.

The amount of the agent added to the molten polymer prior to extrusion or spinning is from 0.5 to 8.0 percent by weight of the polymer. The amount is varied to accommodate process and product parameters, such as fiber diameter, mixing and curing times for preparation of the concrete, and differences in the concrete mixtures.

Suitable melt additives include surface active agents which can be uniformly mixed with the molten polymer without decomposition at melt processing temperatures. These agents may include silicone surfactants, polysiloxanes, fatty acid esters and ethers, polytetrahydrafuran, and the like, and these agents will normally be in the form of liquids at the melt processing temperature. Those additives are added to the new polymer or injected into the molten stream prior to extrusion.

A particularly suitable form of additive is based on a polydimethylsiloxane backbone modified by the chemical attachment of polyoxyaleylene chains. One such compound is sold under the trade designation as MASIL SF 19.

In addition to the primary melt additive, secondary additives may be added to improve processing and handling or to improve dispersion and/or cohesion of the fiber in the cement. Examples include low molecular weight organic compounds which cause the wetting agent to rise to the surface of the fiber more quickly, antistatic agents, fine inorganic powders such as silica and chemical coupling agents.

For the purpose of the wettability of the fibers, the fiber length and diameter are not critical and are selected to suit a particular end use application. Typical fiber lengths are 1 to 50 mm, and fiber diameters may range from 5 microns to thousands of microns.

Since a surface active is applied as a melt additive, there is no need for topical application of a wetting agent as described in the prior art, and this step may be eliminated. The polymer is simply extruded or spun into filaments, cooled, drawn and chopped into fibers, normally by a rotating roll carrying spaced blades.

In the production of fine polypropylene fibers having diameters of less than 50 microns, or for other applications, it may be considered desirable to provide some degree of temporary binding between the fibers to hold them in the form of bundles until the fibers are added to the concrete. The melt additives in the polymer may serve this purpose. In the alternative, a water soluble binder may be applied to the filaments already prepared with the melt additive, prior to chopping the tow. The binder may be applied with the use of a suitable liquid applicator such as dip/squeeze rolls, kiss roll, or eyelet guide contact.

Various water soluble binders may be used, which are typically devoid of wetting agents, although a small amount of wetting agent may be employed. Binders considered suitable include carboxymethyl cellulose, starch, clay, polyvinyl alcohol, as well as pigments, fillers, coupling agents, and the like. The binder is applied as aqueous media, followed by drying, and the dried binder should be solid and non-hydroscopic.

The amount of binder employed is that sufficient to at least partially coat the filaments and provide temporary adhesion between the fibers, and the amount employed is preferably less than 10 percent by weight and more preferably less than 5 percent.

If the fiber is employed to prevent cracking of concrete during curing, the fiber will have a diameter less than 50 microns, and polypropylene will have a denier in the order of from about two to about eight. In such applications, it becomes beneficial to use the lowest denier fiber as may be practical for production and handling because the effectiveness of the fiber is in relation to the surface area thereof. At a denier of about 3, the fiber is effective when employed in the amount of 0.25 to 1.5 pounds per cubic yard of concrete, whereas larger additions are required as the denier increases.

Larger diameter fibers, for example, having a diameter of a straw, are incorporated into concrete for the purpose of reinforcing the concrete after curing. In such applications, it is desirable to incorporate larger amounts of the fiber into the concrete mix, and the improved wettability of the fiber of the present invention reduces the difficulty in obtaining uniform blends with the concrete mix.

While various types of concrete, mortar and cement mixes are known, the exact dry composition of these materials is not at all critical, for example, Portland cement mixed with sand and aggregate. These compositions all have in common the fact that they are formed into a slurry or paste by mixing with water and are capable of setting or curing after pouring or placement of the mixture at the desired location and form, such as a slab or a wall.

The features of the present invention offer distinct advantages, in that the polypropylene fibers containing the melt additive are more durably wettable and do not quickly lose this property upon initial exposure to an aqueous media. Also, the water soluble binder, if employed, can be designed in terms of type and amount to better accommodate fibers of various diameters, to control rate of solubility, and to afford a media into which other beneficial agents may be incorporated.

While the present invention has been described in connection with polypropylene polymers, which are relatively inexpensive to produce, it is expected that the invention would be applicable to any type of modified or unmodified polyolefins, polyesters and other hydrophobic polymers.

What is claimed is:

1. A method of improving the properties of concrete, said method comprising the steps of providing an aqueous concrete mixture, and incorporating into said mixture a quantity of thermoplastic polyolefin fibers, said fibers containing, as internal melt additive, a wetting agent which blooms to the surface of the fibers and reduces the surface tension of the fibers to renders the fibers wettable.

2. The method of claim 1 comprising the additional step of applying a topical binding agent to the fibers containing said agent.

3. The method of claim 2 wherein said topical binding agent holds said fibers together in the form of bundles.

4. The method of claim 2 wherein said topical binding agent is water soluble.

5. The method of claim 2 wherein said topical binding agent is water soluble.

* * * * *